(No Model.)
W. MAIN.
POWER TRANSMITTING DEVICE.
No. 407,092. Patented July 16, 1889.
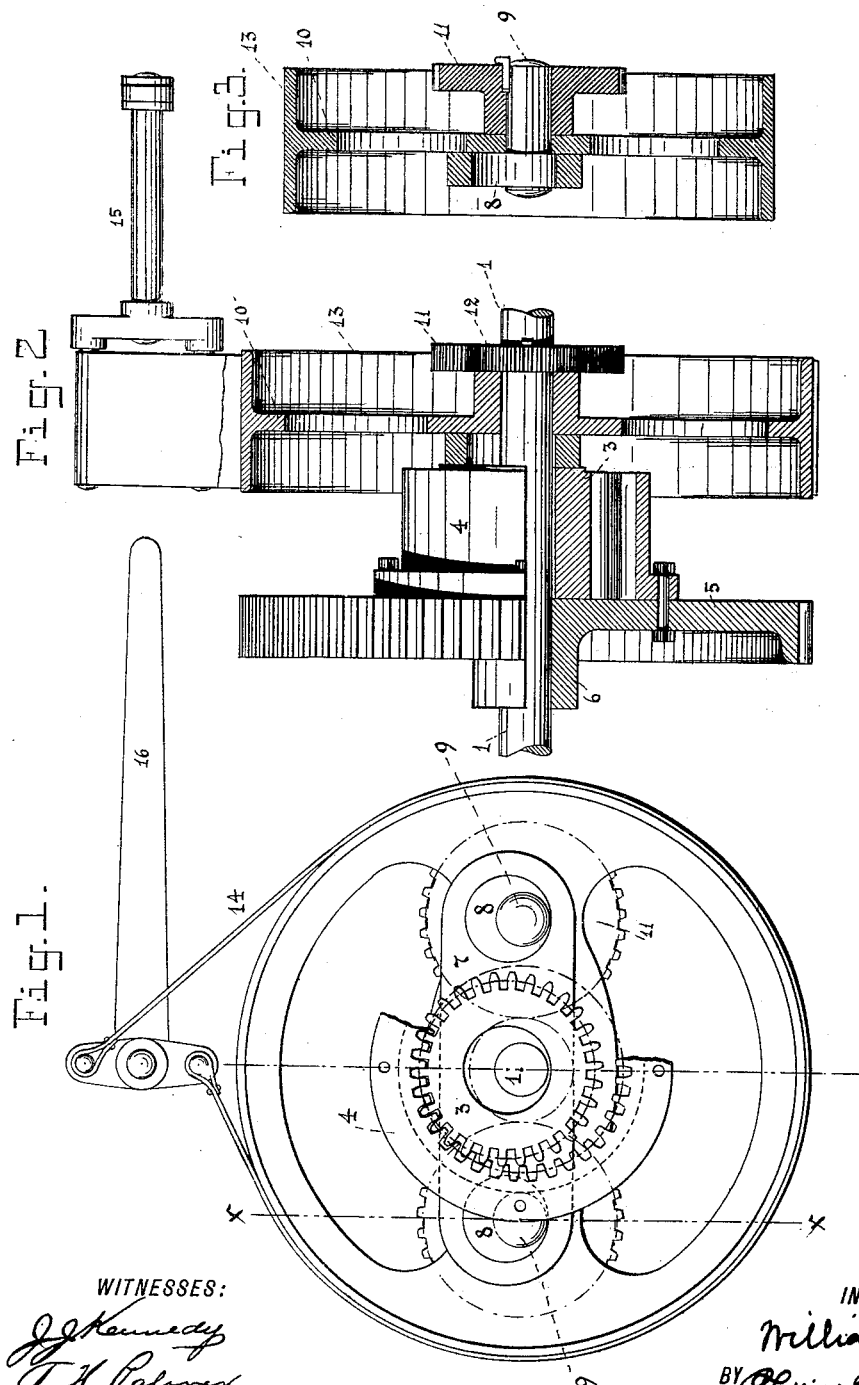
WITNESSES:
INVENTOR
William Main
BY Philipp Phelps & Hovey
ATTORNEYS

UNITED STATES PATENT OFFICE.

WILLIAM MAIN, OF BROOKLYN, NEW YORK.

POWER-TRANSMITTING DEVICE.

SPECIFICATION forming part of Letters Patent No. 407,092, dated July 16, 1889.

Application filed June 13, 1888. Serial No. 276,987. (No model.)

*To all whom it may concern:*

Be it known that I, WILLIAM MAIN, a citizen of the United States, residing at Brooklyn, county of Kings, and State of New York, have invented certain new and useful Improvements in Power-Transmitting Devices, fully described and represented in the following specification and the accompanying drawing, forming a part of the same.

The object of my invention is to provide a simple and compact device for transmitting motion from a power-shaft or the like to mechanism to be driven thereby.

My invention relates to the application for the transmission of power of what is known as the "Watt sun-and-planet gear" by means of mechanically-practical mountings and connections in such a manner as to impart motion to the driven mechanism only when the oscillating member of said gear is restrained to constant parallelism by means of a connection or guide mechanism extending from the oscillating gear to a guide-bearing, which guide-bearing rotates with it when the power is not being transmitted, but may be restrained or retarded so as to throw the driving and driven mechanism into operative connection, and in such manner that regularity of speed shall be imparted to the driven mechanism.

In another application, filed June 13, 1888, Serial No. 276,982, I have shown and described a variety of mechanisms embodying my invention, and have explained at length the character of the mechanisms, generically considered.

My present application has for its object the protection by Letters Patent of my invention embodied in mechanism wherein the connection or guide mechanism governing the action of the oscillating gear consists of parts swinging in a path of complete rotation in a plane perpendicular to the axis of rotation of the gear.

In other applications filed of even date herewith I have described and claimed specifically my invention applied in connection with the other types of guides mentioned in the said generic application, No. 276,982, and in still another application, filed of even date herewith, I have claimed the method involved in the practice of my invention. These matters I therefore do not claim in this application.

An important part of my invention, generically considered, and which I claim here in combination with the particular form of guide herein shown and claimed, consists of a bearing for the guide mechanism, which normally rotates in unison with the driving-gear of a sun-and-planet series of gear-wheels, but which may be restrained or retarded so as to throw the driving and driven mechanism into operative connection. The restraint or retardation of this bearing may be gradually accomplished by a friction-brake or other suitable device, and the power of the shaft and the momentum stored up in its rotating connections may thus be gradually and without shock or jar transferred to the driven mechanism.

Figure 1 is a side view of a mechanism embodying my invention. Fig. 2 is a longitudinal elevation partly in section, and Fig. 3 is a section upon the line *x x* of Fig. 1.

The shaft 1 is a driving-shaft, adapted to be operated from any convenient source of power, moving freely within a circular opening 2, eccentric to the shaft in the oscillating gear-wheel 3, which constitutes the initial member of the sun-and-planet series. Outside of and about this gear-wheel is an annular gear-wheel 4, concentric with the driving-shaft 1, and bolted to the web 5 of a power-transmitting gear, mounted, by means of a hollow sleeve or hub 6, upon the driving-shaft, and from which the power is conveyed by any appropriate connection to the driven machinery. This hollow sleeve, together with such mechanism as may be driven from it, I have termed herein "driven mechanism," meaning to include therein any mechanism to which the power transferred through the gears may be applied. The oscillating gear-wheel 3 is provided with an extension 7, rigid therewith, which extension has in each end a circular aperture in which is fitted an eccentric, or an equivalent, a crank 8. These eccentrics or cranks 8 are formed upon crank-shafts or pins 9, which pins are journaled in and pass through the web 10 of a friction-brake pulley 13, and have keyed thereon upon the opposite side of the said web the gear-wheels 11, which latter wheels intermesh with the gear 12, fast upon the driving-shaft, by which gear 12 the gears 11 are caused to rotate. These crank-shafts 9 constitute in this device the guide mechanism by which the oscillating gear-wheel is connected with the restrainable guide-bearing, (represented in this device by the pulley 13,) by the restraint of which guide-bearing the control of the oscillating gear-wheel is effected. The oscillating gear-wheel 3 and the pulley 13, it will be seen, must maintain fixed positions relatively to each other as regards rotation, their absolute relative positions changing as the shaft revolves to the extent permitted by the eccentric mounting of the extension 7 of the gear-wheel with reference to the crank-shafts 9, each oscillation of the gear-wheel corresponding with a revolution of each of the crank-shafts 9 upon its axis. Consequently, when the pulley or guide-bearing 13 is free to revolve, the gear 3 is also free and will convey no power from the shaft 1 to the outer gear 4. When, however, the pulley is restrained by brakes applied thereto, the gear 3 will be forced to remain in positions of parallelism to itself and will be caused by gears 11 and 12, the crank-shafts 9, and cranks or eccentries 8 to follow a path of oscillation without turning upon its center, causing power to be transmitted from the driving-shaft 1 to the driven mechanism. It will be observed that if the shaft 1 were provided with an eccentric fitting the aperture 2 of the gear-wheel 3 the apparatus would be operative without the gearings 11 and 12, but would operate with friction and strain, owing to the short leverage of the eccentrics or cranks 8. The gearings 11 and 12, if used in such case to positively drive the crank-shafts 9, and thus facilitate and promote the operation of the device, would require to be all of equal size, that they might not bind against the eccentric on the driving-shaft.

The power will be transferred through the gears with motion reduced to an extent depending upon the ratio between the gear 3 and the gear 4 and between gears 11 and 12. The amount of this reduction may be readily calculated according to well-known rules, which require no special explanation here.

To state the principle of the mechanism in another way, the line of the governing-points of the driving-gear 3, which in this case we may conceive to be its horizontal diameter, is constrained to always maintain, as it oscillates, positions of parallelism with respect to a line fixed in space, (represented in this case by the horizontal diameter of the pulley 13,) the mechanism effecting this constraint being the crank-shafts 9 and their eccentrics or cranks 8.

Brakes of any suitable construction are required to control the pulley 13, in order to effect transmission of power through the gears, and I have shown a friction-band 14, adapted to be tightened or loosened upon the periphery of the friction-brake pulley by means of a revoluble shaft 15, operated by the hand-lever 16 or the like.

It is true that that part of the mechanism which represents the line fixed in space, and which for convenience I will term a "guide-bearing," may be absolutely so fixed, instead of having a motion, as is the case with the pulley 13; but it is desirable that it should be movable, in order that the power may be imparted to the driven machinery gradually and without sudden jar. The preferable sort of motion for this part of the machine is rotatory, since it permits a convenient application of brakes, and thereby the speed of power-transmission may be varied within wide limits, depending upon the amount of pressure applied to the brakes. I do not, however, confine myself to the use of friction-brakes; but have shown them as a convenient and desirable restraining device. Neither do I confine myself to the particular form of those parts which constitute the connections between the oscillating gear and the abutment, since these forms may be indefinitely varied while maintaining the motion in a path of complete rotation in a plane perpendicular to the axis of rotation of the oscillating gear-wheel.

I wish it understood that the broad scope of the invention to which I lay claim in the present application embraces any form of guide mechanism having a motion of complete rotation in a plane perpendicular to the axis of rotation of a sun-and-planet gear system, and connecting it with a restrainable guide-bearing, whereby the oscillating gear is maintained in positions of constant parallelism with reference to the guide-bearing. I do not confine myself to that form of sun-and-planet gear in which the driving member is within the driven member. The driving member may be without, as in the original invention of Watt. So, too, the power may be transmitted with an increase as well as with a reduction of speed. Nor do I limit myself to a sun-and-planet system in which there are but two gears. There may be intermediate gear-wheels between the driving and driven gears, and the restraining mechanism may be applied to any one of these gear-wheels.

Having thus described my invention, what I claim, and desire to secure by Letters Patent of the United States, is—

1. A power-transmitting device for connecting a driving-shaft with a driven mechanism, consisting of a set of gear-wheels, one of said gear-wheels having a rotary and also an oscillating motion, a restrainable guide-bearing normally rotating with said oscillating gear-wheel, and a guide mechanism for restraining the rotary motion of said oscillating gear-wheel when the guide-bearing is restrained, said guide mechanism having a motion of complete rotation about centers, substantially as described.

2. A power-transmitting device for connecting a driving-shaft with a driven mechanism, consisting of a series of gear-wheels, one of said gear-wheels having a rotary and also an oscillating motion, a restrainable guide-bearing normally rotating with said oscillating gear-wheel, and a guide mechanism for restraining the rotation of said oscillating gear-wheel when the guide-bearing is restrained, said mechanism consisting of two or more crank shafts or pins journaled in the guide-bearing, the crank portions of said shafts moving with the oscillating gear-wheel in its path of oscillation and restraining it to positions of parallelism when the guide-bearing is restrained, substantially as described.

3. A power-transmitting device for connecting a driving-shaft with a driven mechanism, consisting of a series of gear-wheels, one of said gear-wheels having a rotary and also an oscillating motion, a restrainable guide-bearing normally rotating with said oscillating gear-wheel, a guide mechanism for restraining the rotation of said oscillating gear-wheel when the guide-bearing is restrained, said mechanism consisting of two or more crank-shafts or pins journaled in the guide-bearing, the crank portions of said shafts moving with the oscillating gear-wheel in its path of oscillation and restraining it to positions of parallelism when the guide-bearing is restrained, and gearing connecting said crank-shafts and the driving-shaft, whereby the rotation of said crank-shafts on their own axes is promoted, substantially as described.

4. A power-transmitting device for connecting a driving-shaft with a driven mechanism, consisting of a series of gear-wheels, one of said gear-wheels having a rotary and also an oscillating motion, a restrainable guide-bearing normally rotating with said oscillating gear-wheel, a guide mechanism for restraining the rotation of said oscillating gear-wheel when the guide-bearing is restrained, said mechanism consisting of two or more crank shafts or pins journaled in the guide-bearing, the crank portions of said shafts moving with the oscillating gear-wheel in its path of oscillation and restraining it to positions of parallelism when the guide-bearing is restrained, and a brake for restraining the rotation of said guide-bearing, substantially as described.

5. A power-transmitting device for connecting a driving-shaft with a driven mechanism, consisting of a series of gear-wheels, one of said gear-wheels having a rotary and also an oscillating motion, a restrainable guide-bearing normally rotating with said oscillating gear-wheel, a guide mechanism for restraining the rotation of said oscillating gear-wheel when the guide-bearing is restrained, said mechanism consisting of two or more crank shafts or pins journaled in the guide-bearing, the crank portions of said shafts moving with the oscillating gear-wheel in its path of oscillation and restraining it to positions of parallelism when the guide-bearing is restrained, gearing connecting said crank-shafts and the driving-shaft, whereby the rotation of said crank-shafts on their own axes is effected, and a brake for restraining the rotation of said guide-bearing, substantially as described.

6. A power-transmitting device for connecting a driving-shaft with a driven mechanism, consisting of a series of sun-and-planet gear-wheels, a restrainable guide-bearing normally rotating with the driving member of said sun-and-planet gear, and a guide mechanism for restraining the rotary motion of said driving member when the guide-bearing is restrained, said guide mechanism consisting of two or more crank shafts or pins journaled in the guide-bearing, the crank portions of said shafts moving with the oscillating gear-wheel in its path of oscillation and restraining it to positions of parallelism when the guide-bearing is restrained, substantially as described.

7. A power-transmitting device for connecting a driving-shaft with a driven mechanism, consisting of a series of sun-and-planet gear-wheels, a restrainable guide-bearing normally rotating with the driving member of said sun-and-planet gear, a guide mechanism for restraining the rotary motion of said driving member when the guide-bearing is restrained, said guide mechanism consisting of two or more crank-shafts journaled in the guide-bearing, the crank portions of said shafts moving with the oscillating gear-wheel in its path of oscillation and restraining it to positions of parallelism when the guide-bearing is restrained, and gearing connecting said crank-shafts and the driving-shaft, whereby the rotation of said crank-shafts on their own axes is promoted, substantially as described.

8. A power-transmitting device for connecting a driving-shaft with a driven mechanism, consisting of a series of sun-and-planet gear-wheels, the driving member of said gear-wheels being placed within the driven member, a restrainable guide-bearing normally rotating with the driving member of said sun-and-planet gear, and a guide mechanism for restraining the rotary motion of said driving member when the guide-bearing is restrained, said guide mechanism consisting of two or more crank shafts or pins journaled in the guide-bearing, the crank portions of said shafts moving with the oscillating gear-wheel in its path of oscillation and restraining it to positions of parallelism when the guide-bearing is restrained, substantially as described.

In testimony whereof I have hereunto set my hand in the presence of two subscribing witnesses.

WILLIAM MAIN.

Witnesses:
T. H. PALMER,
J. J. KENNEDY.